(12) United States Patent
Pankaj et al.

(10) Patent No.: US 6,665,272 B1
(45) Date of Patent: Dec. 16, 2003

(54) SYSTEM AND METHOD FOR PERSISTENCE-VECTOR-BASED MODIFICATION OF USAGE RATES

(75) Inventors: Rajesh Pankaj, San Diego, CA (US); Matthew Stuart Grob, La Jolla, CA (US); Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/410,204

(22) Filed: Sep. 30, 1999

(51) Int. Cl.[7] .............................................. H04L 12/26
(52) U.S. Cl. ...................................... 370/252; 370/229
(58) Field of Search ................................. 370/252, 253, 370/229, 230, 231, 232, 233, 234, 335, 342, 235, 237, 248, 400, 401, 320, 441

(56) References Cited

U.S. PATENT DOCUMENTS

| | | | |
|---|---|---|---|
| 5,115,429 A | | 5/1992 | Hluchyj et al. ............... 370/84 |
| 5,488,609 A | * | 1/1996 | Hluchyj et al. ............. 370/232 |
| 5,544,196 A | | 8/1996 | Tiedemann, Jr. et al. ... 375/200 |
| 5,596,576 A | * | 1/1997 | Milito ........................ 370/450 |
| 5,619,492 A | | 4/1997 | Press et al. |
| 5,729,542 A | | 3/1998 | Dupont ....................... 370/346 |
| 5,737,313 A | * | 4/1998 | Kolarov et al. ............. 370/234 |
| 5,805,577 A | * | 9/1998 | Jain et al. ................... 370/234 |
| 5,857,147 A | | 1/1999 | Gardner et al. |
| 5,953,338 A | * | 9/1999 | Ma et al. .................... 370/395 |
| 6,055,571 A | * | 4/2000 | Fulp et al. .................. 709/224 |
| 6,097,722 A | * | 8/2000 | Graham et al. ............. 370/395 |
| 6,118,997 A | * | 9/2000 | Kim et al. .................. 455/424 |
| 6,226,277 B1 | * | 5/2001 | Chuah ........................ 370/328 |
| 6,240,287 B1 | * | 5/2001 | Cheng et al. ............... 455/422 |

OTHER PUBLICATIONS

M.H. Chung et al., "Power Allocation for Multi–Rate Multiuser Detection in Wideband CDMA Systems," IEEE, Amsterdam, Sep. 19–22, 1999, Vol. Conf. 50 (pp. 608–612).
S. Lal et al., "Distributed Resource Allocation for DS–CDMA–Based Multimedia ad hoc Wireless LAN's," IEEE Journal on selected Areas in Communications, IEEE Inc. New York, US, vol. 17, No. 5, May 1999 (pp. 947–967).
Y. Guo et al. "Capacity of Multi–Class Traffic CDMA System with Multiuser Receiver," Wireless Communications and Networking Conference, New Orleans, LA, USA, Sep. 21–24, 1999 (pp. 500–504).

* cited by examiner

*Primary Examiner*—Brian Nguyen
(74) *Attorney, Agent, or Firm*—Philip E. Wadsworth; Kent D. Baker; Byron Yafuso (57) ABSTRACT

When a resource of limited capacity is shared by several users, it is possible for the usage rates of the users to exceed the resource's capacity, thereby causing an overload condition. In a system or method according to an embodiment of the invention, at least some of the users have a set of persistence vectors. When an overload condition is detected, the usage rate of at least one of these users is changed, at least in part according to the user's set of persistence vectors.

34 Claims, 7 Drawing Sheets

SYSTEM AND METHOD FOR PERSISTENCE-VECTOR-BASED MODIFICATION OF USAGE RATES

BACKGROUND OF THE INVENTION

1. Field of the Invention

This invention relates to distribution of the use of a limited resource among multiple users. More specifically, this invention relates to the modification of usage rates according to a set of persistence vectors.

2. Description of Related Art and General Background

A shared resource is one which may be used by multiple users. Shared resources which have limited availabilities or capacities include such diverse examples as electric power stations and other energy plants, water sources such as reservoirs and flowing bodies, supply systems for the distribution of goods and/or material, and data communications networks and pathways. Problems associated with allocating the use of a shared resource among multiple users may therefore arise in many different contexts. Regardless of the particular context, however, such resources may be found in many systems in which at least the following conditions hold:

the capacity or availability of the shared resource may be expressed in terms of a finite rate R of units per measure of time (i.e. kilowatts/hour, gallons/minute, cartons/week, or bits/second);

at any particular time, the resource is being used by n different users, where n is a nonnegative integer; and at any particular time, the usage of the i-th user (where $1 \leq i \leq n$) may be characterized by a finite usage rate $u_i$ of units per measure of time.

Figure 1:
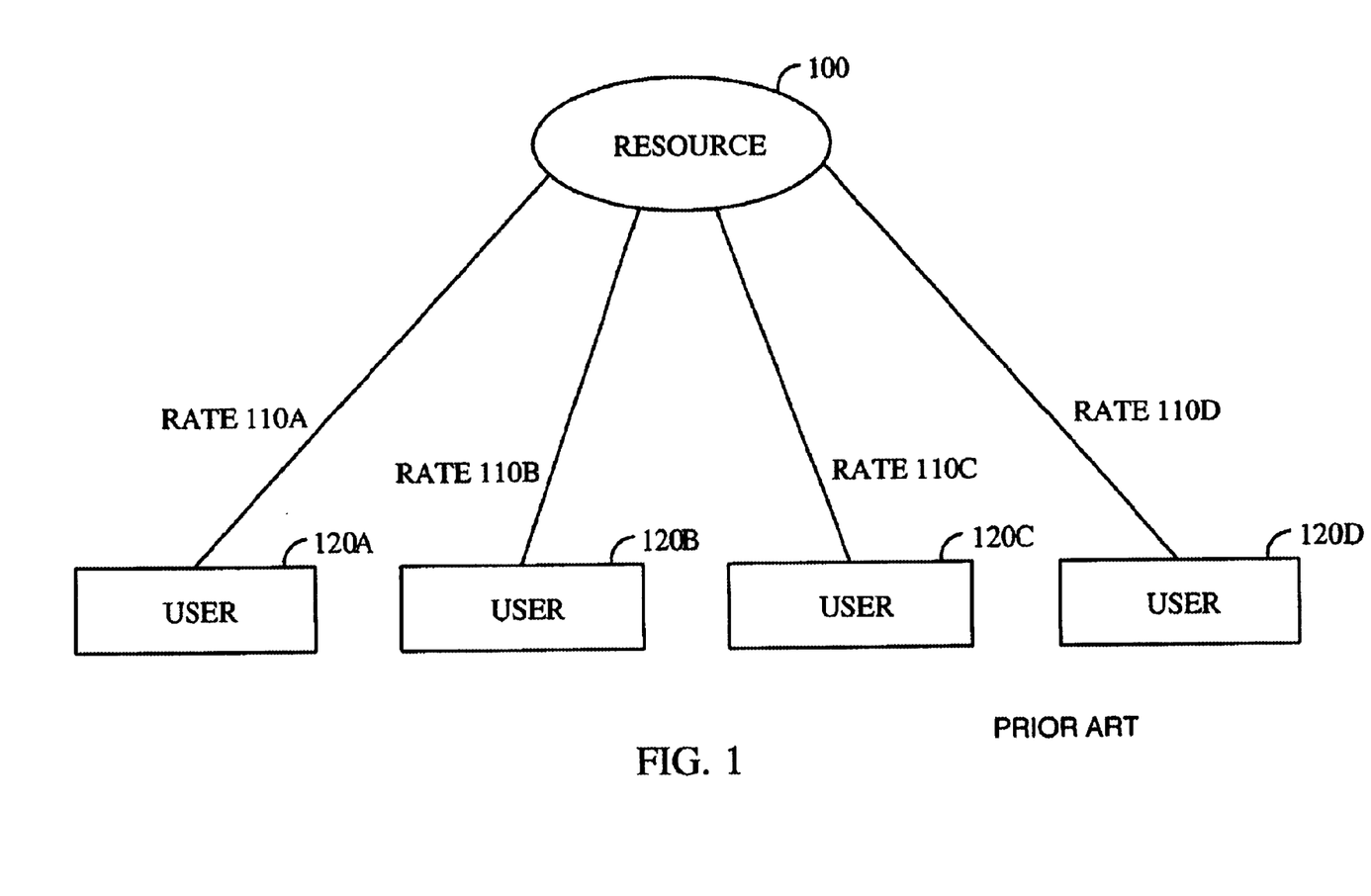
FIG. 1 shows a diagram of a system having a shared resource.

A basic model for such a system is shown in FIG. 1, where resource 100 is used by users 120a–d at rates 110a–d, respectively. Depending on the particular implementation, the rate R which characterizes the shared resource may indicate an actual or estimated limit of the capacity of the resource (e.g. in the case of a communications pathway) or, in the alternative, the rate R may be a threshold indicating a maximum safe or permissible load of the resource (e.g. in the case of a power generation facility or device). Likewise, the usage rates $u_i$ may indicate actual use, expected use, or requests or demands for use.

An overload condition arises when the sum of the n usage rates $u_i$ at any one time exceeds the value R. With respect to a power plant, for example, an overload condition may arise when the total current draw exceeds the rated capacity. With respect to a data communications pathway, an overload condition may arise when the total data transfer rate exceeds the pathway's actual capacity, thereby corrupting the data in transmission. In certain situations such as water supply or warehousing of materials, an overload condition may also indicate that although user demands are currently being met, reserve or buffer capacity is being depleted.

Depending on the nature of the resource, the consequences of an overload condition will vary, possibly including the need for an offline period for resource recovery (e.g. cooling of an power generation system or replenishment of a reservoir) or the need to expend present capacity in order to repeat a use that was attempted in the past but failed because of the overload (e.g. retransmission of a data packet corrupted by a collision). The resource may even become temporarily or permanently unable to regain its former capacity. In any case, it is generally desirable to avoid overload conditions whenever possible.

SUMMARY OF THE INVENTION

A system according to an embodiment of the invention includes a resource and a number of users of the resource. Each user of the resource has a usage rate and a set of persistence vectors, and the user's use of the resource is determined at least in part by the user's usage rate. When a predetermined relationship arises between a sum of the usage rates and a certain measure of the capacity of the resource, then at least one of the users changes its usage rate according to at least its set of persistence vectors.

DETAILED DESCRIPTION OF PREFERRED EMBODIMENTS

When an overload condition arises in a system according to FIG. 1, the users 120 may not be aware that an overload has occurred, especially if the resource is consuming reserve capacity in order to meet user demands. Even if the overload condition causes the resource's availability to a user to drop below a user's expectation or demand, the user may be unable to verify whether the shortcoming is due to a resource overload or to the failure of another component in the supply path. Moreover, in certain applications such as wireless data communications, it is possible that no feedback mechanism exists whereby a user may obtain timely notification of an overload. Therefore, the user may continue to use the resource, unaware of the problem. In such a situation, it is desirable for the system to include a capability for notifying the users of the overload condition via, e.g., a warning signal.

Figure 2:
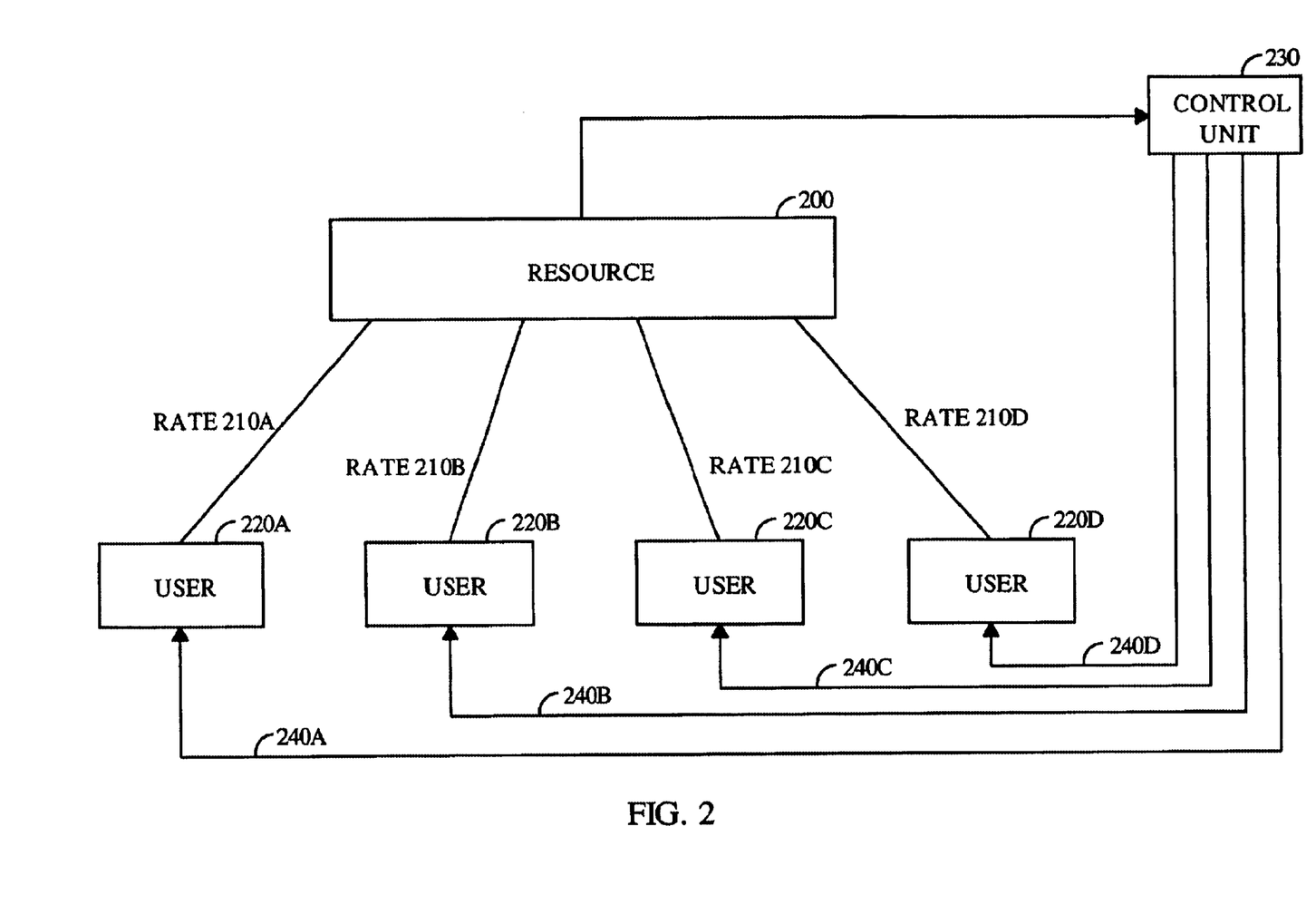
FIG. 2 shows a diagram of a system having a shared resource and a control unit.

FIG. 2 shows an example of such a system, wherein control unit 230 receives information related to usage of resource 200 by users 220a–d and sends feedback information such as a warning signal to users 220a–d over respective communications pathways 240a–d. Note that it is possible for control unit 230 to be implemented as a part of resource 200 or alternatively as a part of one of the users 220a–d.

If a user becomes aware of an overload condition, then the possibility exists for user-driven remediation. In this case, if at least some of the users are able to communicate with each other, then a solution such as a reduction in usage rate may be negotiated. In many instances, however, such communication between users may be unavailable, impractical, or otherwise undesirable, in which case an alternate control mechanism may be provided for controlling usage of the resource. This alternate control mechanism may be centralized and/or decentralized.

If complete knowledge of the future usage requirements of the users were available, then it would be theoretically possible to construct an optimal usage schedule that would satisfy the users' requirements as much as possible while completely avoiding all overload conditions. In many practical systems, however, a user's future needs will be unknown even to the user itself. One way to prevent overload conditions in such systems would be on the basis of current usage requirements: for example, by granting usage rate allocations to users only on a request basis. In order to convey usage requests from the users back to the control unit, however, such a scheme would require an upstream communication pathway which may not otherwise be necessary. Moreover, additional costs and delays are incurred in receiving, processing and responding to such requests.

In order to avoid some of the disadvantages of a request/grant scheme, a decentralized system may be designed wherein control is shared with the users. The control unit in such a system concentrates on the prediction and avoidance of overload conditions while issuing enough feedback information to allow the users to control their own usage to some extent.

Figure 3:
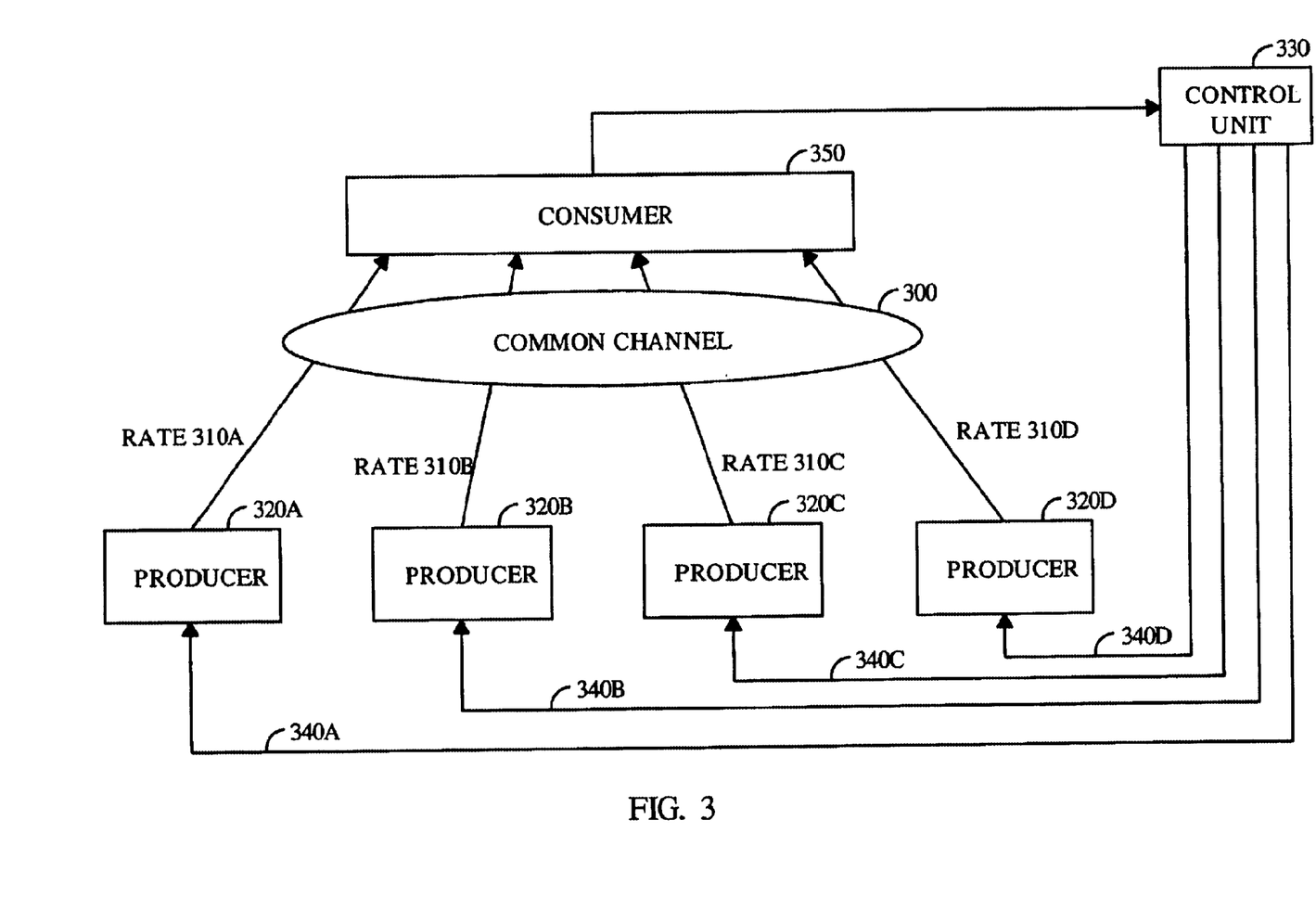
FIG. 3 shows a diagram of a system having a consumer, a plurality of producers, and a common channel.

A method according to an embodiment of the invention may be implemented in any system that fits the model of FIG. 1 wherein the users may obtain notification of an overload condition (as in the modified system of FIG. 2). An exemplary application of such a system is shown in FIG. 3 wherein users 320a–d are data producers, the resource is a common transmission channel 300 linking the producers with data consumer 350, and control unit 330 receives usage information from the consumer. The producers use common channel 300 by transmitting data to consumer 350 at or below rates 310a–d, respectively, and they receive respective signals 340a–d (which may include feedback and/or other control information) from the control unit.

One possible implementation of the exemplary application is the reverse link of a CDMA telecommunications system. In this case, each producer may comprise: 1) a transmitter, such as a mobile telephone or a WLL (wireless local loop) station, connected to; 2) a data-producing device, such as a laptop computer or a point-of-sale terminal, through a PCMCIA card or a similar interface, and outputting data encapsulated in packets over IP or any other suitable protocol. Consumer 350 and control unit 330 may be parts of a base station, and control signals 340 may be carried over a forward link. Several generations and versions of CDMA telecommunications systems have already been implemented. While most of these CDMA systems have been designed to carry digitized voice communications, however, the method herein described is especially well-suited to a network serving producers with widely varying transmission rates, such as a data-only network or a mixed voice-data network.

Figure 4:
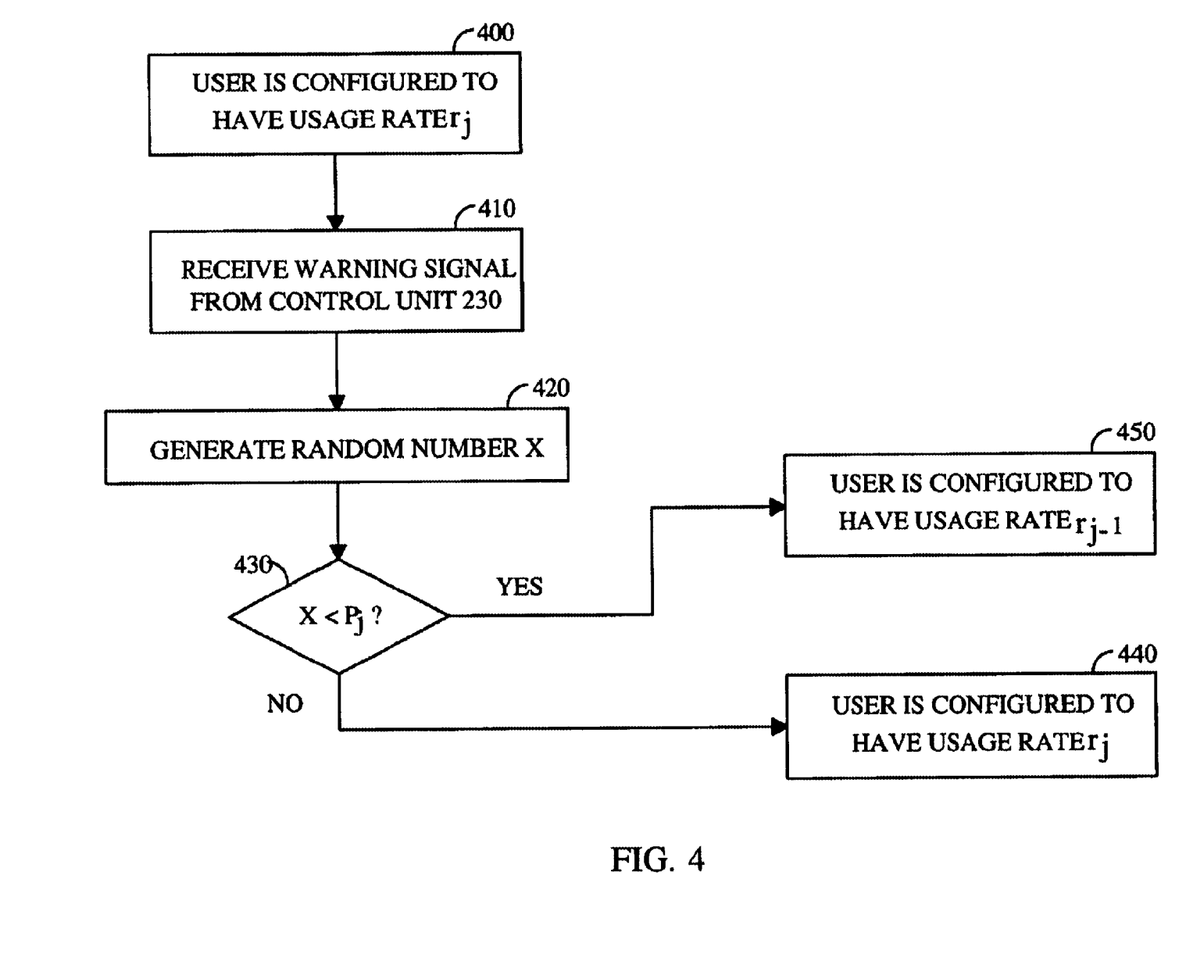
FIG. 4 shows a method according to a first embodiment of the invention.

A method according to a first embodiment of the invention is described in FIG. 4 with reference to the system of FIG. 2. In this method, a user's use of the resource at any particular time is determined in relation to a predetermined usage rate. As noted in block 400, a particular user is configured to have a usage rate $r_j$. The usage rate $r_j$ is one among a set of m predetermined available rates $r_1$ to $r_m$, where the relation a<b implies that $r_a<r_b$. It is not necessary for all users to have the same set of available rates, but the set for each user should be known to control unit 230 so that it may reliably predict the state of resource use and issue a warning signal appropriately. It is also possible for each user's set of available rates to be updated by control unit 230 whether periodically or otherwise. Schemes of rate selection, assignment, and allocation that may be used in systems incorporating an embodiment of the invention include those described in the patent applications Ser. Nos. 09/264,297, now U.S. Pat. No. 6,324,172 entitled "METHOD OF RATE ALLOCATION IN A DATA COMMUNICATIONS NETWORK," filed Mar. 4, 1999, now U.S. Pat. No. 6,324,172, issued Nov. 27, 2001, to Pankaj, and assigned to the assignee of the present invention, and, Ser. No. 09/410,199 now U.S. Pat. No. 6,535,523 entitled "SYSTEM AND METHOD FOR PERSISTENCE-VECTOR-BASED RATE ASSIGNMENT," now U.S. Pat. No. 6,535,523, issued Mar. 18, 2003, to Gadi et al. filed concurrently herewith, assigned to the assignee of the present invention, and the disclosure of which application is hereby incorporated by reference.

Note that the usage rate $r_j$ may indicate a maximum allowable rate, i.e. a permission rather than a requirement to use the resource at the given rate. The actual rate at which the user uses the resource may depend upon other factors in addition to the usage rate, such as a user's current need and/or ability to use the resource. Likewise, note that the actual rate at which the user uses the resource need not be a member of the set of available rates.

In one particular implementation, each user has the same fixed set of available rates, wherein each rate is expressed in kilobits per second (Kb/s) and the set of rates is designed to increment in powers of two. Because a doubling in rate requires a doubling in power to maintain the same ratio of energy per bit to noise power spectral density ($E_b/N_0$), each rate step thus corresponds to a power step of 3 dB. The available rate values in this example include 4.8, 9.6, 19.2, 38.4, 76.8, 153.6, and 307.2 Kb/s.

In addition to a usage rate, each user also has a set of persistence vectors, although it is possible to have other users in the system that lack a set of persistence vectors. The length of each such vector may be any integer greater than zero, and each vector element corresponds to one among the set of available rates and represents a probability that the usage rate will be the corresponding one among the set of available rates. In the exemplary application, each vector element is a persistence value which represents a probability from 0 to 1. The set of persistence vectors may be unique to each user, or the same set may be assigned to all users in a particular class, or the same set may be assigned to all of the users in the system. Likewise, the set of persistence vectors may be a permanent aspect of the operation of the user, or it may be issued by control unit 230, in which case it may be updated periodically or otherwise. Other relevant aspects of persistence vector distribution and use are discussed in application Ser. No. 09/410,199 entitled "SYSTEM AND METHOD FOR PERSISTENCE-VECTOR-BASED RATE ASSIGNMENT," now U.S. Pat. No. 6,535,523, issued Mar. 18, 2003, to Gadi et al., the disclosure of which application is incorporated by reference above.

In this method, the user's set of persistence vectors includes an (m−1)-element vector P, wherein P={$P_k$ such that $1 \leq k \leq m-1$} and m is the number of members of the user's set of available rates. (The vector P may be the only vector in the set of persistence vectors, or vector P may be selected from among others in the set according to such criteria as the most recent usage rate or the most recent actual rate for this user.) Vector P may (but is not required to) have the form of a probability density function, wherein the sum of its elements (or of the values represented by its elements) is equal or substantially equal to one.

In block 410, the user receives a warning signal from control unit 230. This warning signal may issue, for example, when an actual or impending overload condition is detected, and it may be sent to all users or only to a subset of the users (e.g. only to the users who have persistence vectors). Various embodiments and applications of a system wherein the warning signal is indicated by a busy bit in a reverse link signal are described in application Ser. No. 09/346,882 now U.S. Pat. No. 6,556,549 entitled "METHOD AND APPARATUS FOR SIGNAL COMBINING IN A HIGH DATA RATE COMMUNICATION SYSTEM," filed Jul. 2, 1999, now U.S. Pat. No. 6,556,549, issued Apr. 29, 2003, to Bender et al., and assigned to the assignee of the present invention.

Upon receiving the warning signal, the user generates a random number x as indicated in block 420. The range and distribution of x are limited only by the particular implementation; in an exemplary application, x represents a value drawn from a set having a uniform distribution over the range 0 to 1. In block 430, the value of x is tested against the persistence value $P_j$, where $P_j$ is the element of persistence vector P that corresponds to usage rate $r_j$. If the test fails (i.e. x is not less than $P_j$), then the user's usage rate is not affected by the overload condition, as shown in block 440. If the test succeeds (i.e. x is less than $P_j$), however, then the user's usage rate is decreased from $r_j$ to $r_{j-1}$, as shown in block 450. If the user's usage rate is already the lowest rate in the user's set of available rates, then success in block 450 may indicate a reduction to a predetermined lower rate or even a denial of service. This method may be altered to allow the use of one among many other relations between the values of x and $P_j$ in place of the test condition shown in block 430, depending on the particular characteristics of the values chosen for x and $P_j$.

Note that the values given to the elements of persistence vector P will in part influence how the redistribution of resource usage is biased among users starting with different usage rates. For example, a redistribution which is more equitable may be achieved by choosing large values for elements of persistence vector P which correspond to high usage rates and low values for elements of P which correspond to low usage rates. Such a scheme will make it more likely that a user currently having a high usage rate will reduce its rate, while making it less likely that a user already having a low usage rate will have to reduce its rate any further. Note as well that in a case where each persistence vector is associated with a particular member of the set of available rates, the relations between these vectors will also bias the redistribution of resource usage. Also note that use of the rate doubling scheme described above (or a similar non-constant distribution within the set of usage rates) will allow usage rate reductions by high-rate users to free up more resource capacity than usage rate reductions by low-rate users.

Numerous variations of the method described above may be used in applications of this embodiment. For example, the users may share the same set of persistence vectors, or different sets of persistence vectors may be assigned to allow the implementation of a priority scheme among the users. In another variation, the first element of each persistence vector may be eliminated (or set to represent a probability of 1) so that users already having the lowest usage rate will not suffer a further rate reduction. Likewise, more than one among the first elements of the persistence vectors may be so treated to protect users of other low rates.

Additional constraints on usage rate may exist as consequences of other aspects of the particular implementation. For example, the rate at which the user actually uses or accesses the shared resource may be limited by factors such as the user's present capacity or power. Therefore, it is possible that the user may use or may be permitted to use a rate lower than the usage rate granted by this or a similar method.

It may be desirable to choose rate R (a capacity measure of the shared resource) to be a threshold value rather than the actual capacity of the shared resource so that the warning signal is generated before an overload condition occurs, thereby allowing the system to react to avoid the condition. In this case, the threshold R should be selected to take into account at least (1) the longest possible delay in system response, as characterized by the maximum time between generation of the warning signal and the consequent reduction in total resource usage, and (2) the maximum possible increase in resource usage during the period of such delay.

Figure 5:
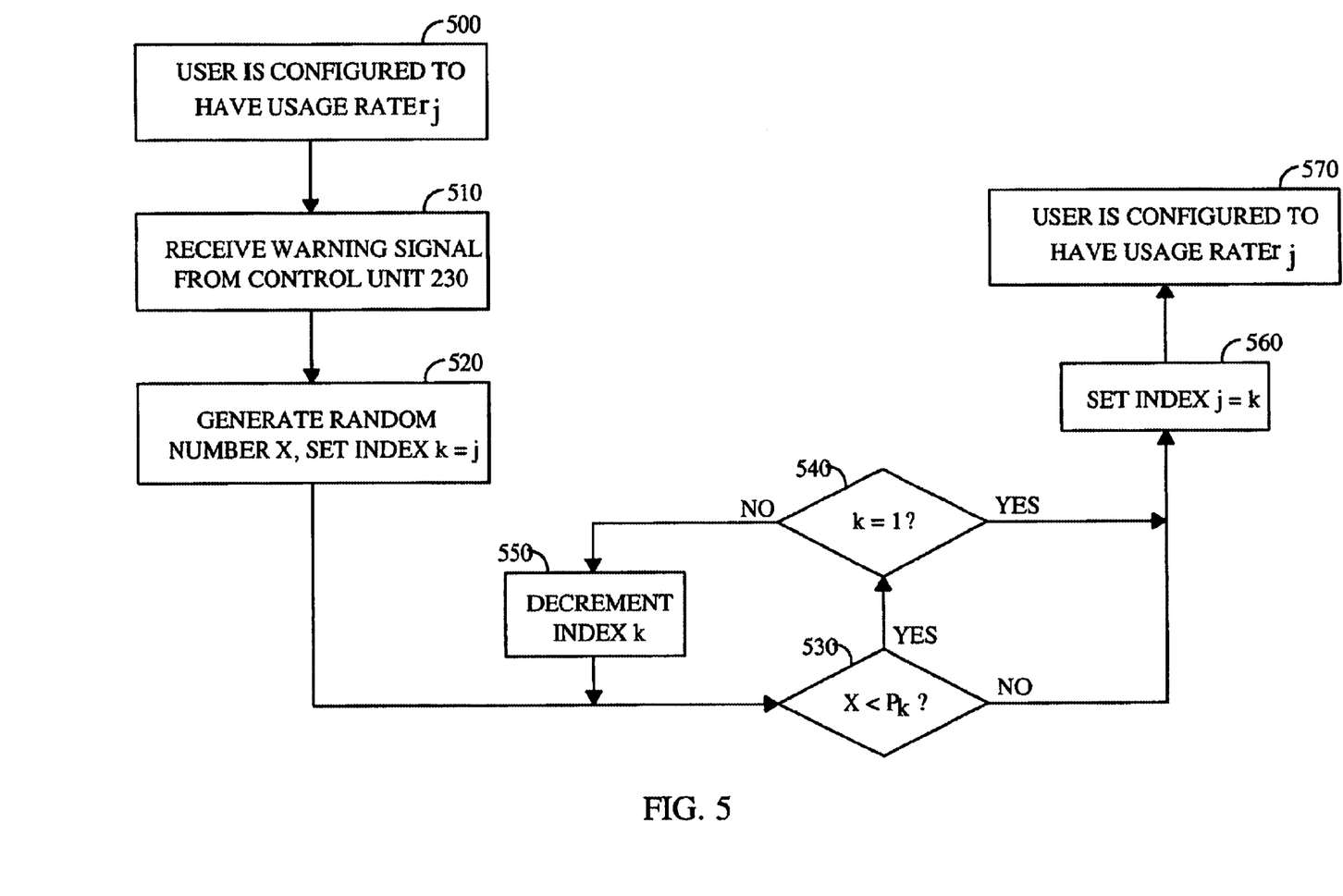
FIG. 5 shows a method according to a second embodiment of the invention.

A method according to a second embodiment of the invention is described in FIG. 5 with reference to FIG. 2. In contrast to the method described above, this method allows the user's usage rate to be reduced to any other rate in the set of available rates rather than to only one particular rate. As in the method described above, a user is configured to have a usage rate $r_j$ from the user's set of available rates $r_1$ to $r_m$ (as noted in block 500) and an (m−1)-element persistence vector P which may be selected from a set according to, for example, the index j. In block 510, a warning signal is received from control unit 230, and in block 520 the user generates a random number x as described above. At this stage, the user also sets an index k to be equal to the index j.

In block 530, the value of x is tested against the persistence value $P_k$, where $P_k$ is the element of persistence vector P that corresponds to usage rate $U_k$. If the test fails (i.e. x is not less than $P_k$), then the index j is set to be equal to k in block 560, and the method ends in block 570 with the user being configured to have the usage rate $r_j$. In this case, in other words, the user's usage rate is not affected by the overload condition.

If the test in block 530 succeeds (i.e. x is less than $P_k$), then the value of the index k is tested. If k is already at its minimum value (i.e. one in this example), then the procedure continues to blocks 560 and 570 as above. Otherwise, the value of k is decremented (i.e. reduced by one) and the test is repeated. Under this method, when block 570 is finally reached, the user may be configured to have any usage rate in the set which is equal to or less than the usage rate indicated in block 500. Again, this method may be altered to allow the use of one among many other relations between the values of x and $P_k$ in place of the test condition shown in block 530, depending on the particular characteristics of the values chosen for x and $P_k$.

Figure 6:
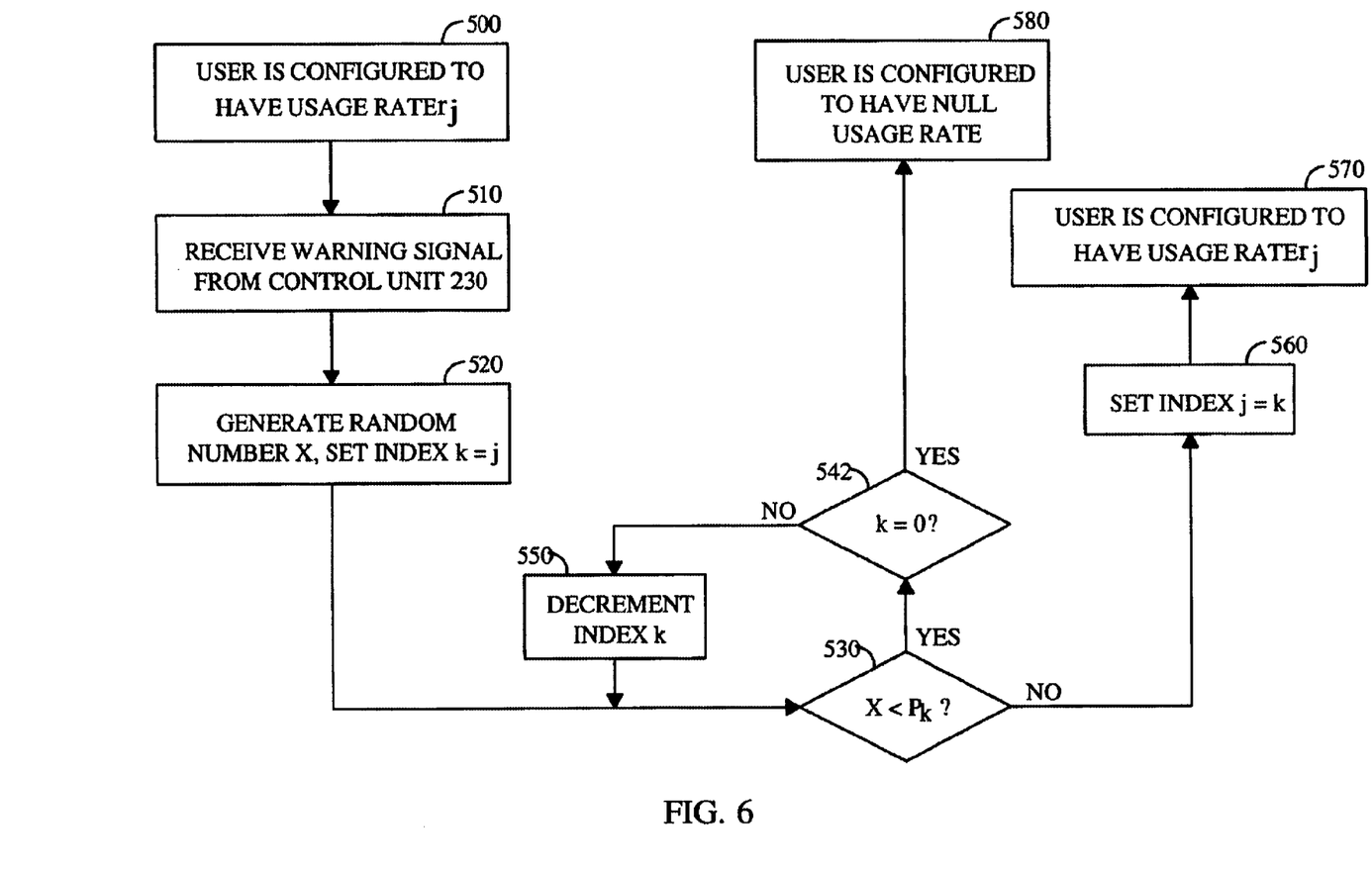
FIG. 6 shows a variation of the method of FIG. 5.
Figure 7:
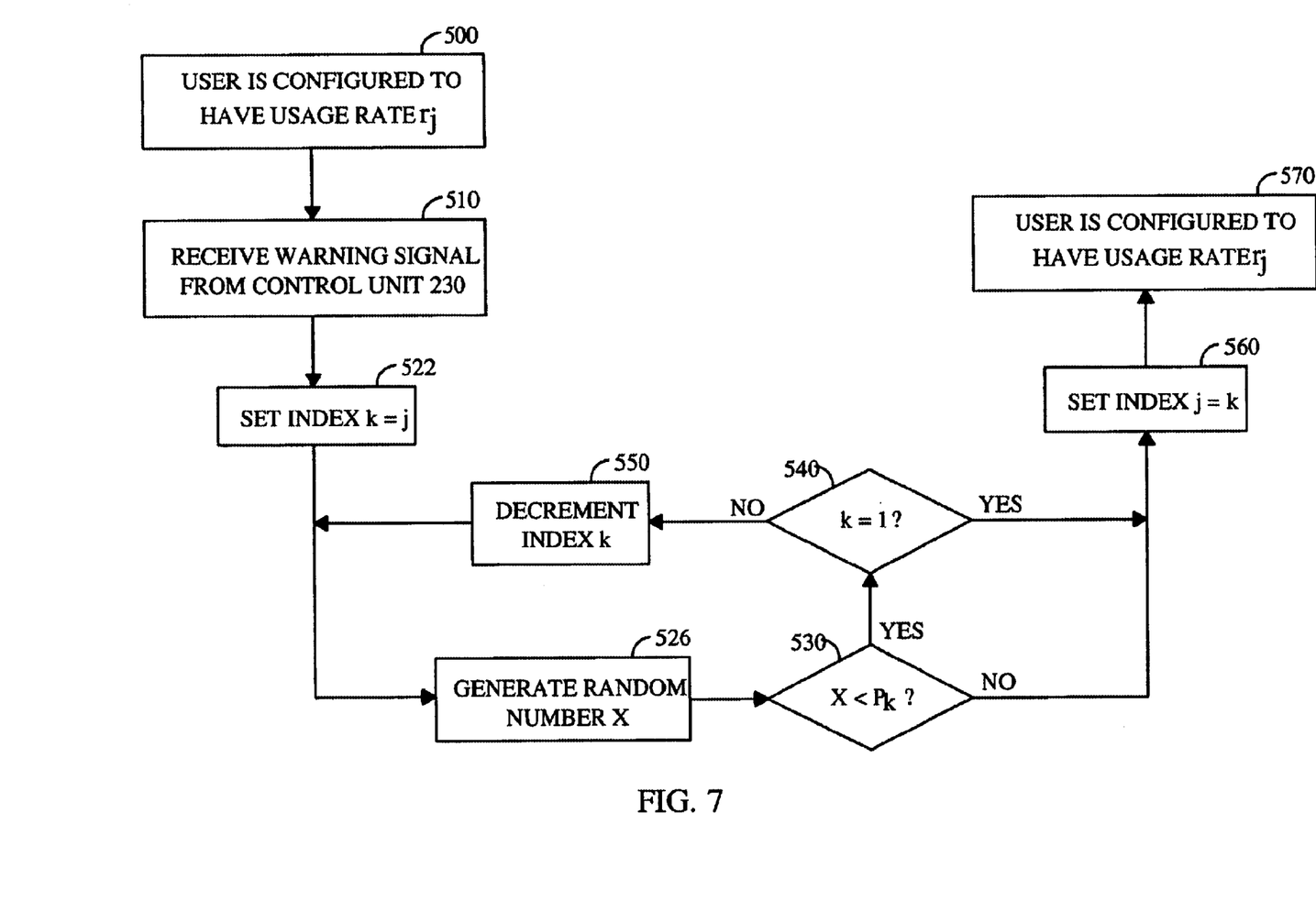
FIG. 7 shows an additional variation of the method of FIG. 5.

In a variation of this method as shown in FIG. 6, it is possible for the user to be denied usage of the shared resource. Block 540 is replaced with block 542, which allows the index k to reach a value of zero. When that event occurs, the user is configured to have a null usage rate in block 580. This null usage rate may represent some predetermined rate outside the set of available rates (e.g. a minimal rate which draws from reserved capacity) or it may represent a usage rate of zero and thus a complete denial of usage. FIG. 7 shows an additional variation of the method of FIG. 5, wherein a new random number x is generated in block 526 at every iteration of the loop (in this variation, block 520 may be reduced as in block 522 to include only the initialization of index k).

With respect to the methods shown in FIGS. 4–7, note that a minimum bound of the selected usage rate may be established by setting elements of the persistence vector which correspond to that rate and to any lesser rates to indicate a probability of 1 (i.e. setting these elements to zero in the examples of FIGS. 4–7). In such a case, the tests in blocks 430 and 530 will fail when that rate is reached (or when the procedure is called with the user already having a lower usage rate), and no further reduction in usage rate will occur.

The foregoing description of the preferred embodiments is provided to enable any person skilled in the art to make or use the present invention. Various modifications to these embodiments are possible, and the generic principles presented herein may be applied to other embodiments as well. For example, indices such as those for the set of available rates and the persistence vector being referenced may begin at zero, or at any other number or symbol, rather than beginning at one. Likewise, in a set of available rates, the relation a<b may imply that $r_a > r_b$, or the various rates may be arranged in some other order instead.

Additionally, the invention may be implemented in part or in whole as hard-wired circuits, as circuit configurations fabricated into application-specific integrated circuits, or as firmware programs loaded into non-volatile storage or software programs loaded from or into data storage media as machine-readable code, such code being instructions executable by arrays of logic elements such as microprocessors or other digital signal processing units. Thus, the present invention is not intended to be limited to the embodiments shown above but rather is to be accorded the widest scope consistent with the principles and novel features disclosed in any fashion herein.

What is claimed is:

1. A system comprising a resource having a capacity measure;
    a user having a usage rate and a set of persistence vectors,
    wherein a use of the resource by the user is determined at least in part by the usage rate of the user;
    wherein when a predetermined relation exists between a total resource usage rate and the capacity measure, the user changes its usage rate according to the set of persistence vectors;
    wherein the total resource usage rate is the sum of usage rates of a plurality of users,
    wherein each among the plurality of users has a set of available rates, the user's usage rate being a member of the user's set of available rates,
    wherein each element of each vector in the set of persistence vectors of each among the plurality of users corresponds to a member of the user's set of available rates; and
    wherein each element of each vector in the set of persistence vectors of each among the plurality of users indicates a probability that the user's usage rate will change to be equal to the corresponding member of the user's set of available rates.

2. The system according to claim 1, wherein each persistence vector of said at least one persistence vector corresponds to a member of the user's set of available rates.

3. The system according to claim 2, wherein said user is one of a plurality of users, wherein each of the plurality of users has the same set of available rates.

4. The system according to claim 1, wherein the predetermined relation exists when the total resource usage rate is not s than the capacity measure.

5. The system according to claim 1 wherein the usage rate of the user is determined at least in part by a predetermined relation between a random number generated by the user and a persistence value from said at least one persistence value.

6. The system according to claim 1, wherein when the predetermined relation exists, the user changes its usage rate based on a predetermined relation between a random number generated by the user and a selected persistence value of a vector in the user's set of persistence vectors,
    wherein said selected persistence value corresponds to the users usage rate.

7. The system according to claim 1, wherein when the predetermined relation exists, the user reduces its usage rate based on a predetermined relation between a random number generated by the user and a selected persistence value of a vector in the user's set of persistence vectors,
    wherein said selected persistence value corresponds to the user's usage rate.

8. The system according to claim 7, wherein the random number has a uniform distribution.

9. The system according to claim 7, wherein the predetermined relation exists when the total resource usage rate is not less than the capacity measure.

10. The system according to claim 1, said system further comprising a control unit, wherein the control unit sends a warning signal to the user when the predetermined relation exists.

11. The system according to claim 10, wherein the user's usage rate is determined at least in part by a predetermined relation between a random number generated by the user and a persistence value from the at least one persistence value.

12. The system according to claim 10, wherein the user comprises a data producer, and each among the usage rates comprises a rate of data production.

13. The system according to claim 12, wherein the resource is a wireless channel for data communications; and
    wherein use of the resource comprises transmitting data over the wireless channel.

14. The system according to claim 13, wherein the resource is the reverse link of a wireless CDMA channel for data communications.

15. The system according to claim 14, wherein the value of at least one member of a user's set of available rates is substantially equal to $19,200 \times 2^i$ bits/second, wherein i is an integer.

16. The system according to claim 13, wherein, the value of a first available rate of the set of available rates is substantially equal to double the value of a second available rate of the set of available rates.

17. The system according to claim 13, wherein the set of available rates comprises a null usage rate.

18. The system according to claim 13, wherein the control unit modifies the set of persistence vectors.

19. The system according to claim 13, wherein the capacity measure is less than an actual capacity of the resource.

20. The system according to claim 13, wherein the capacity measure is a predetermined threshold determined by at least an actual capacity of the resource, a minimum delay between sending a warning signal and obtaining a resulting reduction in usage of the resource, and a maximum increase in resource usage over a period of the minimum delay.

21. The system according to claim 1, wherein said user is one of a plurality of users, wherein each of the plurality of users has the same set of available rates.

22. The system according to claim 21, wherein each among the plurality of users has the same set of persistence vectors.

23. The system according to claim 22, wherein the predetermined relation exists when the total resource usage rate is not less than the capacity measure.

24. The system according to claim 22, wherein the user's usage rate is determined at east in part by a predetermined relation between a random number generated by the user and a persistence value of said at least one persistence value.

25. The system according to claim 22, wherein when the predetermined relation exists between a sum of the usage rates and the capacity measure, the user reduces its usage rate according to a predetermined relation between a random number generated by the user and a selected persistence value of a vector in the user's set of persistence vectors, wherein said selected persistence value corresponds to the user's usage rate.

26. The system according to claim 25, wherein the predetermined relation exists when the total resource usage rate is not less than the capacity measure.

27. The system according to claim 26 further comprising a control unit, wherein the control unit sends a warning signal to the user when the predetermined relation exists.

28. The system according to claim 21 further comprising a control unit, wherein the control unit sends a warning signal to the user when the predetermined relation exist.

29. The system according to claim 28, wherein the resource is a wireless channel for data communications; and wherein use of the resource comprises transmitting data over the wireless channel.

30. The system according to claim 29, wherein the resource is the reverse link of a wireless CDMA channel for data communications.

31. A method comprising:

using a shared resource at a first usage rate from a set of usage rates;

receiving a warning signal, said warning signal relating to use of the shared resource;

generating a random number;

comparing the random number to at least one persistence value from a persistence vector, wherein the persistence vector comprises a persistence value for each usage rate in the set of usage rates;

selecting a second usage rate from the set of usage rates based on said comparing; and using responsive to receiving the warming signal, the shared resource at the second usage rate.

32. A computer readable medium containing computer-executable instructions embodying a method, the method comprising:

using a shared resource at a first usage rate from a set of usage rates;

receiving a warning signal, said warning signal relating to use of the shared resource;

generating a random number;

comparing the random number to at least one persistence value from a persistence vector, wherein the persistence vector comprises a persistence value for each usage rate in the set of usage rates;

selecting a second usage rate from the set of usage rates based on said comparing; and using the shared resource at the second usage rate.

33. A system comprising:

a resource having a capacity measure; and a plurality of users, each having a usage rate and a set of persistence vectors, a means for determining use of the resource by each among the plurality of users in part by the usage rate of each among the plurality of users; and a means for changing the usage rate of at least one among the plurality of users according to the at least one among the plurality of user's set of persistence vectors, wherein each among the plurality of users has a set of available rates, the user's usage rate being a member of the user's set of available rates, wherein each element of each vector in the set of persistence vectors of each among the plurality of users corresponds to a member of the user's set of available rates; and wherein each element of each vector in the set of persistence vectors of each among the plurality of users indicates a probability that the user's usage rate will change to be equal to the corresponding member of the user's set of available rates.

34. A method comprising:

using a shared resource having a capacity measure, the shared resource being shared by a plurality of users, each having a usage rate and a set of persistence vectors;

determining use of the shared resource at least in part by the usage rate of each among the plurality of users;

changing at least one usage rate of at least one among the plurality of users according to at least one among the plurality of user's set of persistence vectors, receiving a warning signal, said warning signal relating to use of the shared resource, and obtaining a random number wherein determining use of the shared resource is determined at least in part by comparing the random number to at least one element of a persistence vector.

* * * * *